(12) United States Patent
Nocon et al.

(10) Patent No.: US 10,981,073 B2
(45) Date of Patent: Apr. 20, 2021

(54) LOCALIZED AND STANDALONE SEMI-RANDOMIZED CHARACTER CONVERSATIONS

(71) Applicant: Disney Enterprises, Inc., Burbank, CA (US)

(72) Inventors: Nathan D. Nocon, Valencia, CA (US); Stephen A. Thornton, Burbank, CA (US); Timothy M. Panec, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1 day.

(21) Appl. No.: 16/167,213

(22) Filed: Oct. 22, 2018

(65) Prior Publication Data

US 2020/0122046 A1     Apr. 23, 2020

(51) Int. Cl.
| | | |
|---|---|---|
| *A63H 3/28* | (2006.01) | |
| *G10L 21/007* | (2013.01) | |
| *H04W 4/02* | (2018.01) | |
| *G06F 16/683* | (2019.01) | |

(52) U.S. Cl.
CPC ............ *A63H 3/28* (2013.01); *G06F 16/683* (2019.01); *G10L 21/007* (2013.01); *H04W 4/023* (2013.01); *A63H 2200/00* (2013.01)

(58) Field of Classification Search
CPC ........ A63H 3/28; A63H 5/00; A63H 2200/00; G06F 16/683; G06F 16/685; G10L 21/00; G10L 21/003; G10L 21/007; G10L 21/013; G10L 2021/0135
USPC ....................................... 446/175, 297, 404
See application file for complete search history.

(56) References Cited

U.S. PATENT DOCUMENTS

| | | | | |
|---|---|---|---|---|
| 4,318,245 A | * | 3/1982 | Stowell | G09B 5/04 200/61.52 |
| 5,113,449 A | * | 5/1992 | Blanton | G10L 13/033 704/261 |
| 5,749,073 A | * | 5/1998 | Slaney | G10H 7/008 704/203 |
| 6,309,275 B1 | | 10/2001 | Fong et al. | |
| 6,800,013 B2 | | 10/2004 | Liu | |
| 7,478,047 B2 | * | 1/2009 | Loyall | G06F 3/011 704/258 |

(Continued)

FOREIGN PATENT DOCUMENTS

| | | |
|---|---|---|
| WO | 2017120180 A1 | 7/2017 |
| WO | 2018089700 A1 | 5/2018 |

OTHER PUBLICATIONS

Quijada, S. et al., "Development of an expressive social robot", ETSII, Dep. of Automatic Control, University of Valladolid, Valladolid, Spain, 2002, 7 pages.

*Primary Examiner* — Joseph B Baldori
(74) *Attorney, Agent, or Firm* — Patterson + Sheridan, LLP (57) ABSTRACT

Techniques for randomized device interaction are provided. A first communication pattern is selected, with at least a degree of randomness, from a plurality of communication patterns, where each of the plurality of communication patterns specifies one or more audio profiles. A first audio profile specified in the first communication pattern is identified. A first portion of audio is extracted from a first audio file with at least a degree of randomness, and the first portion of audio is modified based on the first audio profile. Finally, the first modified portion of audio is outputted by a first device.

20 Claims, 6 Drawing Sheets

(56) References Cited

U.S. PATENT DOCUMENTS

| | | | |
|---|---|---|---|
| 7,983,910 B2* | 7/2011 | Subramanian | G10L 19/0018 |
| | | | 704/250 |
| 8,457,969 B2* | 6/2013 | Ae | G10H 1/0091 |
| | | | 704/268 |
| 8,540,546 B2 | 9/2013 | Lipman | |
| 8,591,282 B2 | 11/2013 | Jang | |
| 8,737,677 B2* | 5/2014 | Jacob | G06K 9/00 |
| | | | 382/100 |
| 8,825,483 B2* | 9/2014 | Bardino | G10L 21/04 |
| | | | 704/258 |
| 8,898,062 B2* | 11/2014 | Kato | G10L 13/033 |
| | | | 704/266 |
| 9,367,282 B2* | 6/2016 | Tanaka | G10H 1/0025 |
| 9,667,773 B2* | 5/2017 | Kawa | G06F 16/685 |
| 9,814,993 B2 | 11/2017 | Ponomarev et al. | |
| 10,065,124 B2* | 9/2018 | Goslin | G10L 21/003 |
| 2002/0042713 A1 | 4/2002 | Kim et al. | |
| 2003/0158728 A1* | 8/2003 | Bi | G10L 21/00 |
| | | | 704/207 |
| 2007/0233472 A1* | 10/2007 | Sinder | G10L 21/00 |
| | | | 704/219 |
| 2007/0233489 A1* | 10/2007 | Hirose | G10L 13/033 |
| | | | 704/258 |
| 2008/0147413 A1* | 6/2008 | Sobol-Shikler | G10L 13/033 |
| | | | 704/278 |
| 2011/0070805 A1* | 3/2011 | Islava | A63H 3/28 |
| | | | 446/397 |
| 2014/0170929 A1* | 6/2014 | Lipman | A63H 3/00 |
| | | | 446/175 |
| 2014/0278395 A1* | 9/2014 | Zurek | G10L 15/065 |
| | | | 704/233 |
| 2015/0140893 A1 | 5/2015 | Lipman et al. | |
| 2016/0038842 A1 | 2/2016 | Zheng | |
| 2016/0063989 A1* | 3/2016 | Deleeuw | G10L 15/22 |
| | | | 345/473 |
| 2016/0361663 A1 | 12/2016 | Watry | |
| 2017/0274289 A1 | 9/2017 | Judkins et al. | |
| 2018/0126292 A1 | 5/2018 | Ghaly | |
| 2018/0154514 A1 | 6/2018 | Angle et al. | |
| 2018/0294001 A1* | 10/2018 | Kayama | G10L 15/02 |

* cited by examiner

LOCALIZED AND STANDALONE SEMI-RANDOMIZED CHARACTER CONVERSATIONS

BACKGROUND

Field of the Invention

The present disclosure generally relates to semi-randomized toy interactivity, and more specifically, to use of audio manipulation to enable increased interactivity.

Description of the Related Art

Toys and characters often have prerecorded phrases or audio effects that can be played to increase the immersion for users who interact with the character. For example, some toys have pull strings, push buttons, and the like that triggers one or more prerecorded sound effects. Typically, these sounds are recorded using voice actors or complex audio mixing, which increases the costs of the toy or character. Further, the restricted set of phrases or sounds that the device is capable of outputting can drastically limit interactivity and immersion for users interacting with the device. Additionally, devices cannot readily interact with each other, unless multiple conversational scripts are prepared and recorded by voice actors, which significantly increases costs of producing the devices. Moreover, even these more complex interactions are limited by the scripted and prerecorded content, which prevents the devices from becoming truly interactive or immersive.

SUMMARY

According to a first embodiment of the present disclosure, a method is provided. The method includes selecting, with at least a degree of randomness, a first communication pattern from a plurality of communication patterns, wherein each of the plurality of communication patterns specifies one or more audio profiles. The method further includes identifying, with at least a degree of randomness, a first audio profile specified in the first communication pattern. Additionally, the method includes extracting a first portion of audio from a first audio file. The method also includes modifying the first portion of audio based on the first audio profile. Finally, the method includes outputting, by a first device, the first modified portion of audio.

According to a second embodiment of the present disclosure, a computer program product comprising a computer-readable storage medium having computer-readable program code embodied therewith is provided. The computer-readable program code is executable by one or more processors to perform an operation including selecting, with at least a degree of randomness, a first communication pattern from a plurality of communication patterns, wherein each of the plurality of communication patterns specifies one or more audio profiles. The operation further includes identifying a first audio profile specified in the first communication pattern. Additionally, the operation includes extracting, with at least a degree of randomness, a first portion of audio from a first audio file. The operation also includes modifying the first portion of audio based on the first audio profile. Finally, the operation includes outputting, by a first device, the first modified portion of audio.

According to a third embodiment of the present disclosure, a system including one or more computer processors and a memory containing a program which when executed by the one or more computer processors performs an operation is provided. The operation includes selecting, with at least a degree of randomness, a first communication pattern from a plurality of communication patterns, wherein each of the plurality of communication patterns specifies one or more audio profiles. The operation further includes identifying a first audio profile specified in the first communication pattern. Additionally, the operation includes extracting, with at least a degree of randomness, a first portion of audio from a first audio file. The operation also includes modifying the first portion of audio based on the first audio profile. Finally, the operation includes outputting, by a first device, the first modified portion of audio.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present disclosure provide techniques to generate randomized or semi-randomized conversations and communications, which can significantly improve the interactivity of devices, and the immersion of users. In some embodiments, devices utilize predefined patterns of communication to generate random, semi-random, or pseudo-random interactions. In one embodiment, each pattern specifies one or more audio profiles that are used to define the audio associated with the respective portion or segment of the interaction. In some embodiments, each device selects all or a portion of one or more prerecorded audio files, applies the profile(s) specified by the communication pattern, and outputs the resulting modified audio. In one embodiment, the device then transmits a confirmation or indication that the output is complete. In some embodiments, the device can also receive an indication specifying a communication pattern and/or interaction.

In an embodiment, the device can then generate a pseudo-random output that aligns with the specified pattern.

In this way, embodiments of the present disclosure enable devices to interact with each other in an immersive and realistic manner, without requiring extensive scripting or voice acting. For example, in an embodiment, a first device can select a communication pattern and generate an initial greeting based on a profile specified in the pattern. A second device can then receive an indication as to the selected pattern, as well as an indication as to which profile(s) in the pattern should be used to generate the response. In some embodiments, this process can be repeated until the interaction is concluded. In one embodiment, interactions can be interrupted by a predefined timeout, an interaction or action by a user, a random transition, and the like. Thus, embodiments of the present disclosure improve the functionality of interactive devices by allowing them to generate and maintain dynamic and semi-randomized collaborative communications and conversations, which significantly improves the immersion of the device.

Furthermore, embodiments of the present disclosure enable the devices to be created with reduced resources, and further enable the devices to operate with reduced computational resources. For example, because the techniques provide pseudo-randomized interactions, the time and expenditures required to develop new devices or interactions (e.g., to script and record interactions) is dramatically reduced. Similarly, by utilizing predefined communication patterns to generate pseudo-random interactions, the set of audio files needed to generate dynamic and immersive interactions is dramatically reduced, as less storage is required to achieve high levels of immersion.

In the context of the present disclosure, reference is made to performing various operations (e.g., selections, modifications, and the like) in a random manner. Unless otherwise stated, terms such as "random" and "randomized" include semi-random, pseudo-random, quasi-random, and similar terms that involve some degree of unpredictability. In some embodiments, the operations may include some degree of randomness, as well as some degree of structure or predictability. For example, a subset of patterns may be identified based on one or more rules or characteristics of the devices, and a pattern to utilize may be selected from that subset in a randomized manner. Similarly, in some embodiments, the sampled audio files are delineated into discrete portions (e.g., into equal portions, or into portions defined by a user), and the portions are selected in a randomized manner.

Figure 1:
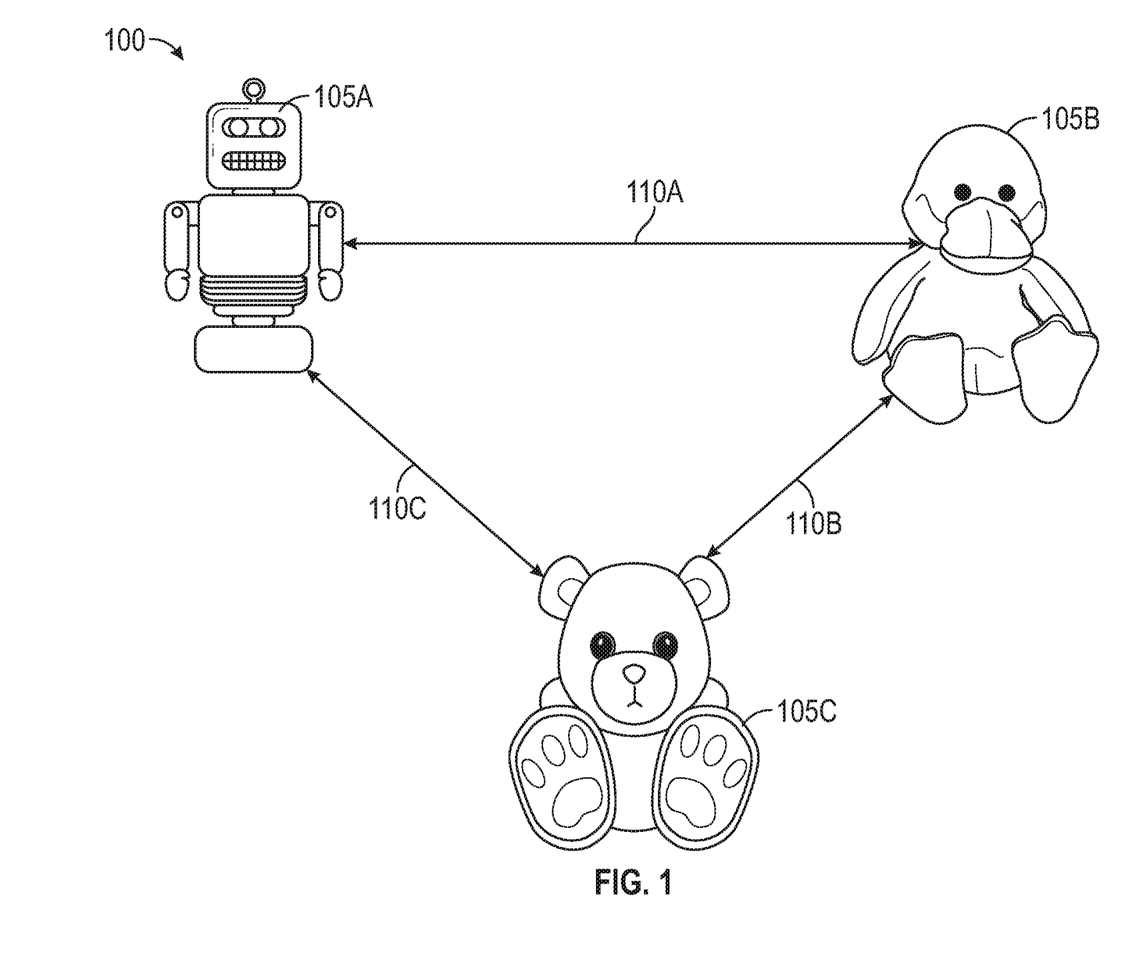
FIG. 1 illustrates a system including several interactive devices configured to generate and participate in audio interactions, according to one embodiment disclosed herein.

FIG. 1 illustrates a system 100 including several Interactive Devices 105 configured to generate and participate in audio interactions, according to one embodiment disclosed herein. In the illustrated system 100, Interactive Devices 105A, 105B, and 105C are communicatively coupled, as illustrated by the arrows 110A, 110B, and 110C. In one embodiment, the Interactive Devices 105A-C are configured to communicate via one or more personal area networks (PANs). For example, in one embodiment, the Interactive Devices 105A-C utilize a short range communication protocol such as Bluetooth® or Bluetooth Low Energy (BLE). In some embodiments, each of the Interactive Devices 105A-C also includes one or more speakers or audio output devices. In some embodiments, one or more of the Interactive Devices 105A-C can include other input or output devices, such as microphones, motors, actuators, buttons, lights or LEDs, accelerometers, magnetometers, tilt or vibration sensors, and the like. In the illustrated embodiment, the Interactive Device 105A is a robot toy, the Interactive Device 105B is a duck toy, and the Interactive Device 105C is a bear plush toy. However, these examples are not intended to be limiting, and any sort of character or toy can be used to implement embodiments of the present disclosure.

In the illustrated embodiment, the Interactive Devices 105A-C can generate audio output based on predefined audio profiles and/or communication patterns. In one embodiment, each Interactive Device 105A-C can select a communications pattern (or receive a selection or indication of a communications pattern), identify an audio profile in the pattern, and generate an output based on the audio profile. In some embodiments, this initial selection process is performed based on determining that one or more other Interactive Devices 105A-C are within a predefined range or distance. For example, in one embodiment, each of the Interactive Devices 105A-C utilize received signal strength indication (RSSI) to determine a rough or estimated distance between themselves and the other Interactive Device(s) 105.

In one embodiment, upon determining that one or more Interactive Devices 105 are within a predefined distance, one or more of the Interactive Devices 105 select a communications pattern. In one embodiment, the Interactive Devices 105A-C are each associated with respective priorities, and the Interactive Device 105A-C with the highest priority acts as the initiator for the interaction (e.g., selects the communication pattern and outputs the first audio). In another embodiment, the Interactive Devices 105 jointly select a communications pattern. In one embodiment, each Interactive Device 105 selects a communications pattern and transmits it to the other Interactive Device(s) 105, and whichever device completes this task first (e.g., as evidenced by a timestamp included in the transmission) is elected as the initiating device.

In the following examples, Interactive Device 105A is used as the initiating device. Of course, in embodiments, any of the Interactive Devices 105 can act as the initiating device. In one embodiment, the Interactive Device 105A selects a communications pattern from a list or set of predefined patterns. In some embodiments, each communication pattern indicates how many Interactive Devices 105 are involved in the interaction, and the Interactive Device 105A selects a pattern based in part on how many other Interactive Devices 105 are within the predefined distance or range. In some embodiments, each Interactive Device 105 transmits an identifier that the other Interactive Devices 105 that specifies the type or category to which the respective device belongs. For example, in such an embodiment, all robot toys may have a first type, while all animal toys have a second type. Similarly, in some embodiments, each toy may have a personality type (such as "outgoing," "shy," and the like). In some embodiments, the communications pattern is selected based in part on a "personality" or identity of the Interactive Device 105A, and/or the identity of the other Interactive Device(s) 105B-C.

In embodiments, a communication pattern is a predefined collection of actions or profiles that can be used to generate an interaction between devices. For example, in an embodiment, each communication pattern is delineated into a series of portions or segments, where each segment includes at least one audio profile. In embodiments, the audio profiles are utilized to adjust or modify the tone, pitch, cadence, and other characteristics of predefined or generated audio. In an embodiment, each segment includes actions or output to be completed by a respective Interactive Device 105. For example, the first segment can be implemented by a first device, and the second segment can be completed by a second device.

In some embodiments, the segments are sequential, such that the second segment's actions (e.g., the audio to be output based on the profiles specified in the second segment) are not initiated until the first segment has been completed. In other embodiments, one or more segments can overlap entirely or partially, such that different Interactive Devices 105 perform actions simultaneously. In some embodiments, each communications pattern is predefined to mimic an interaction type, such as arguing, joking, laughing, sarcasm, somberness, comforting, celebration, and the like. Further, in some embodiments, physical actions can also be included in each segment of the communications pattern. For example, in one embodiment, gestures, motor actuations, and the like can be included in the pattern.

In an embodiment, once the communications pattern has been selected, the Interactive Device 105A identifies the first audio profile specified in the pattern, and generates audio using the profile. In one embodiment, generating the output audio comprises selecting all or a portion of one or more audio files stored by the Interactive Device 105A, and applying the profile. In one embodiment, each Interactive Device 105 represents a character with limited (or non-existent) dialogue or language skills. For example, in such an embodiment, the Interactive Devices 105 may represent characters that primarily communicate (or appear to communicate) using combinations of beeps, nonsense talk, or other non-language babbling or gibberish. In one embodiment, each Interactive Device 105 stores one or more audio files that include noises and gibberish sounds (e.g., random, semi-random, quasi-random, or pseudo-random noises that may appear to mimic or imitate speech and sound similar to normal speech, but that are not actually speech or conversations in any human language).

In one embodiment, each Interactive Device 105 stores different audio files. For example, in one embodiment, a robot character may store audio files comprising beeps and other mechanical or robotic sounds, while a duck character may store audio files including miscellaneous quacks and duck sounds. In some embodiment, one or more Interactive Devices 105 may utilize the same audio files, but apply device-specific filters or profiles to the audio prior to use. For example, the Interactive Devices 105B and 105C may use the same audio, but apply respective profiles that change the intonation, pitch, pace, and/or cadence of the audio to better match the respective character. Further, in some embodiments, some or all of this audio can be generated by the Interactive Device 105 as needed, rather than stored in one or more audio files.

In the illustrated embodiment, the audio profile extracted from the communications pattern specifies changes in pitch, cadence, volume, and any other audio qualities that should be applied at various points or moments in the audio. In some embodiments, the audio profile further specifies a duration of the corresponding audio portion. In one embodiment, based on this audio profile, the Interactive Device 105A selects all or a portion of one or more of the stored audio files to use with the profile. The Interactive Device 105A then performs intonational audio mixing to modify the extracted audio, and outputs via its speaker(s).

In an embodiment, once output of this initial audio is completed by the first Interactive Device 105A, the Interactive Device 105A transmits an indication that the output is complete (e.g., via the communications link 110A or 110C) to the Interactive Device(s) 105B and/or 105C. In one embodiment, the indication further includes an indication as to the communications pattern to be used in generating a response. In some embodiments, the indication also indicates which audio profile from the pattern the Interactive Toy 105A used to generate its output, or which audio profile in the pattern should be used for the next output. Further, in one embodiment, the Interactive Devices 105B or 105C generate a response based on the indicated communications pattern and the next or subsequent profile from the pattern.

In some embodiments, the Interactive Devices 105 can also transmit indications that one or more other devices should initiate an output, regardless of whether the transmitting device's output is complete. Thus, in some embodiments, the received indication instructs the receiving Interactive Device 105 to generate and output audio, but does not necessarily indicate that the transmitting device is finished outputting its audio. In such an embodiment, a communications pattern can specify that the Interactive Devices 105 should, at some point, begin outputting audio at the same time, such that it appears that the devices are arguing or speaking over each other. For example, the Interactive Device 105A may initiate an interaction using such a pattern. Prior to completing the specified output, however, the Interactive Device 105A can transmit, to the Interactive Device(s) 105B and/or 105C, an indication that they should begin outputting the next segment(s) in the pattern. In embodiments, some sections of the communications pattern may specify a typical back-and-forth conversation, while some sections are intended to be performed simultaneously or overlapping.

In some embodiments, the communications pattern specifies which device is to perform each portion or section of the communications pattern. For example, the initiating device may act as the first device specified in the profile, while the responding device acts as a second device from the profile. In one embodiment, if three or more devices are included in the profile, the responding device(s) can determine which Interactive Device 105B-C should respond first based on a variety of factors. For example, as discussed above, in embodiments, the Interactive Devices 105B-C may rely on relative priority, or may determine which device should respond first based on which device first successfully transmits an indication to the other device(s) regarding priority or generating the response.

In this way, the Interactive Devices 105 can dynamically generate a random or semi-random interaction that follows the predefined communication pattern. In some embodiments, when the pattern is completed, the Interactive Devices 105 may await input from a user, or may select a new conversational pattern and initiate a new interaction, as discussed above. In some embodiments, ongoing patterns can also be interrupted by a variety of factors. For example, in one embodiment, each communication pattern is associated with a timeout value. Similarly, in some embodiments, each Interactive Device 105 may periodically generate random or pseudo-random values to determine whether to interrupt the ongoing pattern. Further, in one embodiment, if the user interacts with any of the Interactive Devices 105 (e.g., by picking them up, pushing a button, speaking, and the like), the pattern may be interrupted or terminated. Additionally, in some embodiments, if any of the Interactive Devices 105 are removed from the predefined distance (or are turned off), the communication pattern may be interrupted.

Figure 2:
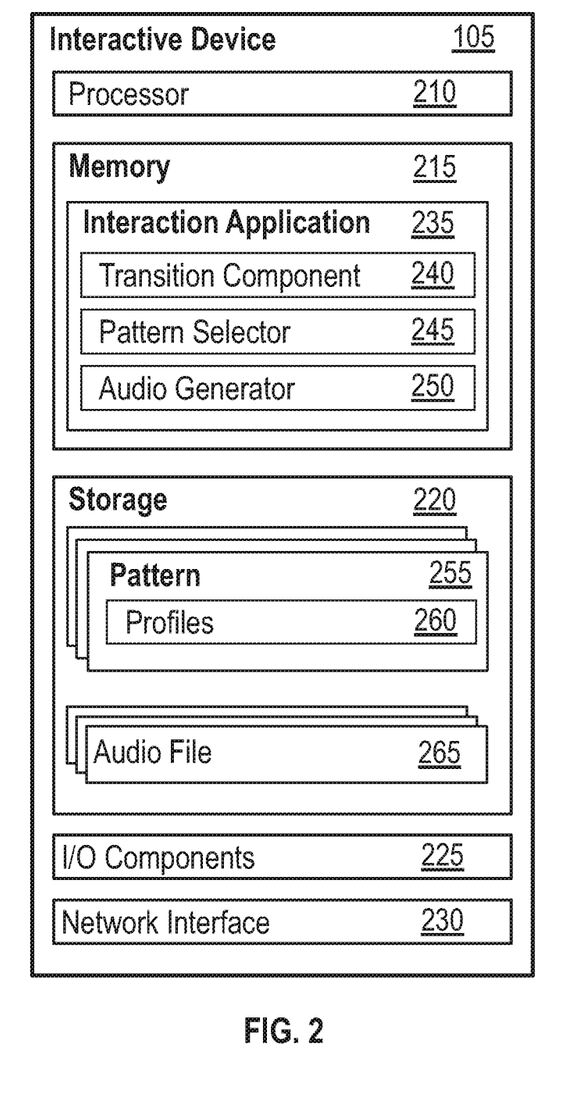
FIG. 2 is a block diagram illustrating an interactive device configured to generate and participate in interactive communications, according to one embodiment disclosed herein.

FIG. 2 is a block diagram illustrating an Interactive Device 105 configured to generate and participate in interactive communications, according to one embodiment disclosed herein. As illustrated, the Interactive Device 105 includes a Processor 210, a Memory 215, Storage 220, I/O Components 225, and a Network Interface 230. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN).

In an embodiment, the I/O Components 225 can include speakers, microphones, buttons, actuators, motors, accelerometers, and the like. Further, in the illustrated embodiment, the Network Interface 230 enables the Interactive Device 105 to be communicatively coupled to other Interactive Devices 105. In one embodiment, the Network Interface 230 enables connection to other devices via one or more PANs. In other embodiments, the Interactive Device 105 may utilize one or more local area networks (LANs) or wireless LANs (WLANs).

In the illustrated embodiment, the Storage 220 includes a set of Patterns 255 defining predefined interactions. Further, as illustrated, each Pattern 255 includes a set of Profiles 260 that define each section or portion of the respective Pattern 255. For example, in an embodiment, each Pattern 255 includes a sequence of Profiles 260, and each Profile 260 specifies characteristics of the audio that should be output for the respective portion of the interaction, such as volume, pitch, intonation, cadence, pace, speed, duration, inflection, and the like. Further, as illustrated, the Storage 220 includes a set of Audio Files 265. As discussed above, in one embodiment, each Audio File 265 includes gibberish or nonsense noises and sounds, or sounds such as animal noises, robot noises, and the like, that can be mixed and modified to imitate conversation. In an embodiment, the therefore, the Profiles 260 specify transformations to be applied to the Audio Files 265, in order to mimic a conversation between the Interactive Devices 105.

As an example embodiment, one such Pattern 255 can be used to simulate a joke, such as a "knock-knock" joke. For example, such a Pattern 255 may specify that the first output should use a first Profile 260, where the first Profile 260 calls for a relatively brief section of audio to be repeated twice (e.g., to simulate the Interactive Device 105 saying "knock knock"). The Pattern 255 may then specify that the responding Interactive Device 105 should use audio that has two syllables or sounds, and a Profile 255 that increases the pitch or inflection at the end of the second sound (e.g., to simulate the device responding "who's there?"). Further, in such an embodiment, the Pattern 255 can specify that the first Interactive Device 105 should respond with a particular Profile 260 (or a random Profile 260) using random audio, but that the selected audio and Profile 260 should also be used by the second device. The next segment of the Pattern 255 can then indicate that the second device should repeat the same output (e.g., the same Audio File(s) 265 and Profiles 260, although the tone, pitch, cadence, or volume may differ), followed by a final sound or noise with an increased pitch (e.g., such that the second Interactive Device 105 appears to be repeating the phrase output by the first device, followed by "who?").

Continuing this example, the Pattern 255 then specifies that the first device should then again repeat the audio that it used the previous iteration, followed by additional audio (modified by one or more Profiles 260) to deliver the "punchline" of the simulated joke. In some embodiments, this Profile 260 can specify that the additional audio should be emphasized, said with increased volume, or said with a different inflection, to indicate it is the punchline. Finally, in such an embodiment, the Pattern 255 can specify that both Interactive Devices 105 should then output a laughter sound, indicating that the joke has completed. Thus, in some embodiments, the Audio Files 265 may include one or more predefined audio that is recognizable (e.g., rather than gibberish), such as laughter, crying, gasping, animal or machine noises, and the like. The above example of a "knock knock" joke Pattern 255 is not intended to be limiting, and is provided as an example of one Pattern 255 that may be used by Interactive Devices 105 to provide simulated and immersive dynamic interactions.

As illustrated, the Memory 215 includes an Interaction Application 235, which is used to generate the dynamic interactions with the user and/or with other Interactive Devices 105. Although illustrated as an application residing in Memory 215, in embodiments, the functionality of the Interaction Application 235 can be implemented using hardware, software, or a combination of hardware and software. The Interaction Application 235 includes a Transition Component 240, a Pattern Selector 245, and an Audio Generator 250. Although illustrated as discrete components, the operations and functionality of the Transition Component 240, Pattern Selector 245, and Audio Generator 250 can be combined or distributed across any number of components. Further, in embodiments, each of the functions of the Transition Component 240, Pattern Selector 245, and Audio Generator 250 can be implemented using software, hardware, or a combination of software and hardware.

In the illustrated embodiment, the Transition Component 240 determines whether to initiate an interaction, transition to a different interaction, or terminate an interaction. In one embodiment, the Transition Component 240 may determine to initiate an interaction based on determining that one or more other devices are within a predefined range. In some embodiments, the Transition Component 240 can also initiate an interaction based on determining that the user has interacted with the Interactive Device 105 (e.g., via a microphone or button, by picking up the device, and the like).

In an embodiment, when an interaction is ongoing, the Transition Component 240 can similarly determine to terminate the interaction or to transition to a different interaction based on user interaction, based on determining that one or more new Interactive Devices 105 have entered the predefined range, based on determining that one or more Interactive Devices 105 have left the predefined range, and the like. Further, in some embodiments, the Transition Component 240 can determine to transition or terminate the interaction based on a timeout associated with the ongoing interaction (e.g., associated with the current Pattern 255 being used to communicate), or based on a random timeout. For example, in one embodiment, the Interaction Application 235 may utilize a random or pseudo-random algorithm to determine whether to continue the interaction, to transition to a different interaction, or to terminate the interaction.

In one embodiment, if the Transition Component 240 determines to transition to a different interaction or to terminate the interaction, the Interaction application 235 can interrupt the other Interactive Devices 105 if they are currently outputting audio (e.g., by generating and outputting new audio). Similarly, in some embodiments, if the Transition Component 240 receives an indication or interruption from one of the other Interactive Devices 105 while the Interaction Application 235 is outputting audio, the Transition Component 240 can interrupt this output in order to terminate the interaction or to continue the new interaction that the other device initiated.

In the illustrated embodiment, when initiating or transitioning to a new interaction, the Pattern Selector 245 selects a Pattern 255 to be used, as discussed above. In embodiments, this selection can be based on the number of Interactive Devices 105 within the predefined distance, the identities, characteristics, or profiles of each of the participating devices, and the like. Further, as illustrated, the Audio Generator 250 selects an audio Profile 260 from the selected Pattern 255, and applies it to the Audio File(s) 265 to transform the audio into a final audio for output. As discussed above, in some embodiments, the Audio Generator 250 first applies a device-specific profile, followed up the particular Profile 260 specified in the Pattern 255. The generated, modified, or transformed audio can then be output via one or more speakers. When the output is complete, the Interaction Application 235 can send an indication to the participating devices, indicating that the output has finished. In some embodiments, this indication identifies the selected Pattern 255, as well as which Profile 260 is next in the interaction (or which Profile 260 was just used).

In some embodiments, although the audio is output via one or more speakers, the other Interactive Devices 105 do not detect or respond to the audio (e.g., they do not utilize microphones to detect the audio). Instead, in one embodiment, the Interactive Devices 105 respond only once the transmission is received, indicating that the audio has been completed. In some embodiments, in addition to outputting the audio, the Interactive Device 105 also utilizes other Input/Output components 225 to enhance the immersion and interactivity of the device. For example, in embodiments, one or more lights may flash or turn on and off, and one or more motors or actuators may operate (e.g., to move a mouth of the Interactive Device 105 in order to mimic speech, to gesture limbs or appendages, and the like). In some embodiments, these additional outputs are further defined in the Pattern 255 and/or Profiles 260. For example, in one embodiment, the Profile 260 being applied may specify to gesture for emphasis at a certain point in the output, to turn or shake the head of the Interactive Device 105, to recoil or move, and the like.

Figure 3:
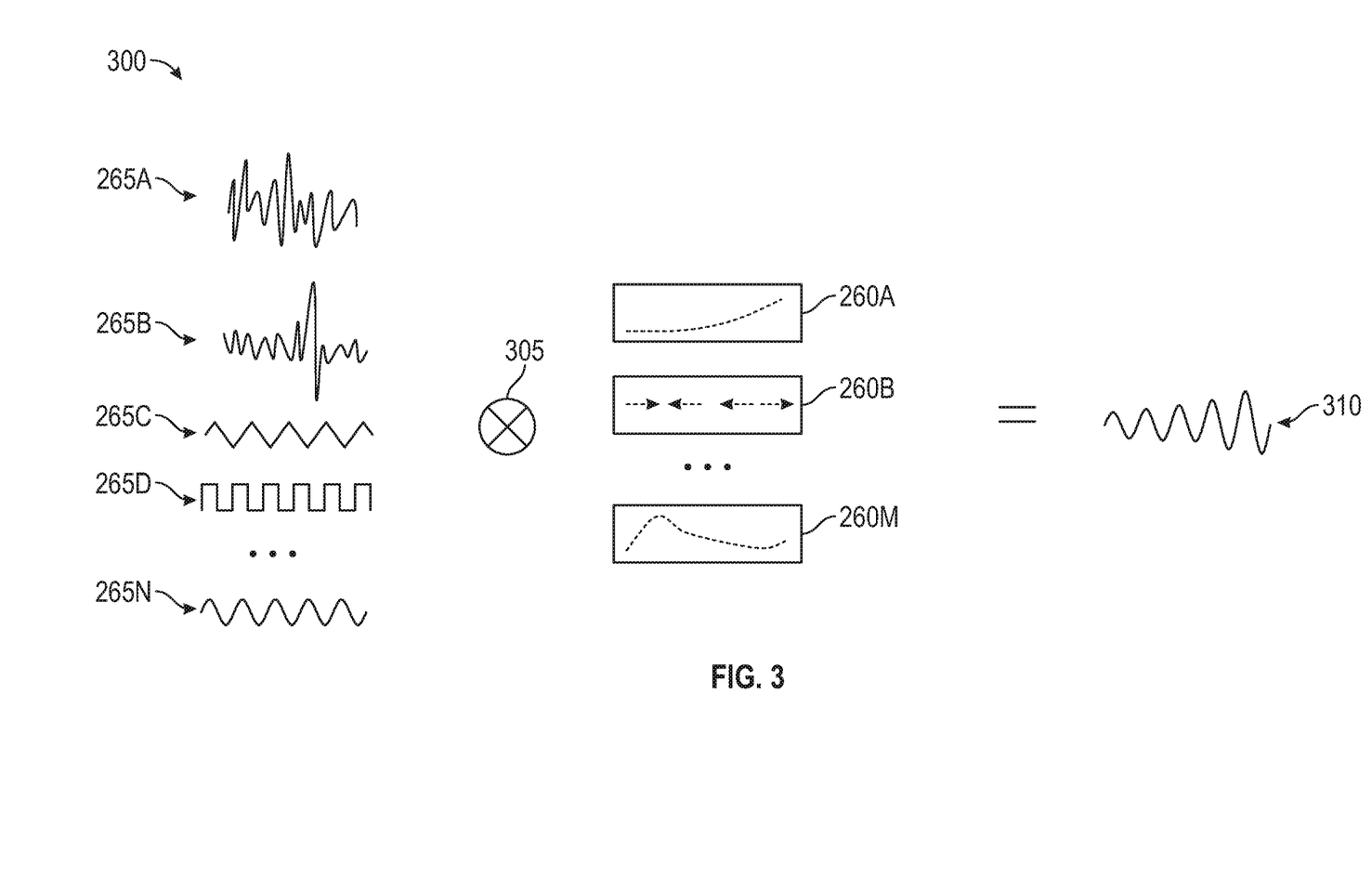
FIG. 3 illustrates workflow for generating audio in an interactive communication, according to one embodiment disclosed herein.

FIG. 3 illustrates workflow 300 for generating audio in an interactive communication, according to one embodiment disclosed herein. In the illustrated workflow 300, a set of Audio Files 265A-N are processed, transformed, or modified using one or more Profiles 260A-M in order to generate a final output Audio 310, as indicated by the Operation 305. In the illustrated embodiment, the Operation 305 indicates any number of audio manipulation operations, including intonational mixing, pitch adjustment, volume modification, pace or cadence alteration, and the like.

In the illustrated embodiment, each Audio File 265 includes a waveform defining the audio. As illustrated, the Audio Files 265 can include smooth waveforms (e.g., Audio Files 265A and 265B) and sharp waveforms or square waves (e.g., Audio Files 265C and 265D). Further, as illustrated, in embodiments, each Audio File 265 can include regular or repeated waveforms, or irregular or non-repeating audio. In embodiments, each Audio File 265 can be any length or duration, and need not be identical. In some embodiments, as part of generating the final Audio 310, the Audio Generator 250 selects one or more of the Audio Files 265 to use. In an embodiment, this selection can be made using a random or pseudo-random algorithm, to ensure that the interaction is dynamic and appears genuine.

In some embodiments, in addition to selecting one or more Audio Files 265, the Audio Generator 250 further selects and extracts individual portion(s) of those Audio File(s) 265 based on a random or pseudo-random algorithm. In embodiments, this can further improve the immersion of the user, because the interactions are generated dynamically and appear random and genuine. In one embodiment, the Audio Generator 250 selects multiple portions of audio from one or more Audio Files 265, and splices them together to create a single file satisfying the duration requirements of the selected Profile 260.

In the illustrated embodiment, each Profile 260 defines transformations to apply to the audio, such as pitch, inflection, and intonation changes, volume changes, cadence, pace, or speed modifications, and the like. For example, as illustrated, the Profile 260A specifies that a defined characteristic of the audio should begin relatively low, and slowly increase (at a growing rate) until the end of the audio. This characteristic may be, for example, pitch, inflection, volume, cadence, and the like. Similarly, the Profile 260B specifies that the cadence, speed, or pace of the audio should be modified as illustrated, such that the first portion of the audio is contracted, and the second portion is elongated. Additionally, the Profile 260M specifies that the audio characteristic (e.g., volume or pitch) should begin low, increase rapidly, and then slowly decline, before again rising at the end of the audio. In some embodiments, the Profiles 260 are predefined. Further, in some embodiments, each Pattern 255 is predefined to include a specified sequence of Profiles 260.

Figure 4:
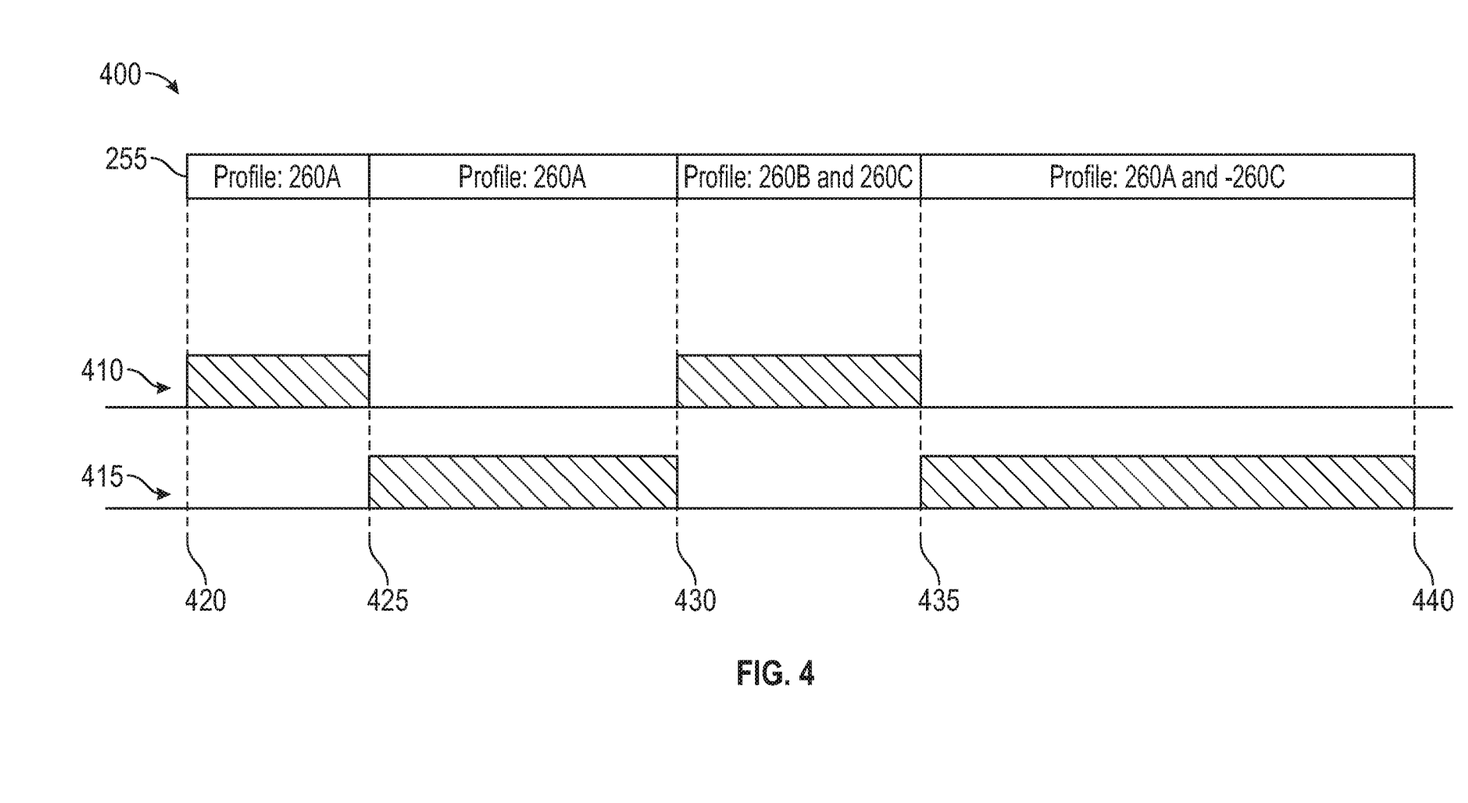
FIG. 4 illustrates a communication workflow, including a pattern and corresponding interactive communications, according to one embodiment disclosed herein.

FIG. 4 illustrates a communication workflow 400, including a Pattern 255 (e.g., a communications pattern 255) and corresponding interactive communications, according to one embodiment disclosed herein. In the illustrated embodiment, the Pattern 255 includes a sequence of segments, portions, outputs, or responses that make up the interaction. Further, as illustrated, each of the portions specifies one or more Profiles 260 to be applied to the corresponding audio segment. Additionally, as illustrated, each portion or output has a predefined length or duration. That is, in some embodiments, rather than the Profile 260 specifying a duration or length, the Pattern 255 specifies the length of each segment of the interaction. In some embodiments, each portion of the Pattern 255 specifies which device is to perform the corresponding output. In one embodiment, when no device is specified, the initiating Interactive Device 105 performs the first output, and the Interactive Devices 105 alternate (or proceed sequentially, if more than two devices are participating) for each subsequent portion of the Pattern 255.

In an embodiment, each segment can specify a single Profile 260 or multiple Profiles 260 to be combined. For example, in the illustrated embodiment, the first and second segments both utilize Profile 260A, while the third segment utilizes Profiles 260B and 260C combined. In some embodiments, a segment can specify to use the inverse of a Profile 260 as well. For example, in the illustrated embodiment, the fourth segment of the interaction utilizes a combination of Profile 260A, along with the inverse of Profile 260C. Although only four segments are illustrated, in embodiments, the Pattern 255 can include any number of segments and continue for any duration.

In the illustrated embodiment, the interactivity or output provided by the first Interactive Device 105 is illustrated along line 410, while the output of the second Interactive Device 105 is illustrated along line 415. Thus, as illustrated, at the moment in time indicated by the dashed line 420, the first Interactive Device 105 initiates an interaction by selecting the Pattern 255, identifying the first Profile 260A, extracting audio from one or more Audio Files 265, and generating the final output audio based on the Profile 260A. As illustrated by the shaded block, this audio is output between the time associated with the line 420, and the time indicated by the line 425. In one embodiment, once the initial audio is complete, at line 425, the first Interactive Device 105 transmits an indication that it has completed its output.

As discussed above, in some embodiments, this indication also includes a reference to the Pattern 255, as well as the current point in the interaction (e.g., based on which segment is next, which Profile(s) 260 are next, and the like). In some embodiments, the selected Pattern 255 is transmitted when the interaction is initiated (e.g., at point 420). In such an embodiment, the transmission at time 425 may simply indicate that the first Interactive Device 105 has completed its segment, and the second Interactive Device 105 can begin the second segment. In some embodiments, the second Interactive Device 105 generates the specified response while the first Interactive Device 105 is outputting the first segment, and begins outputting it as soon as the indication is received.

As illustrated, based on receiving this transmission, at block 425, the second Interactive Device 105 begins outputting the audio corresponding to the second segment of the Pattern 255. This process then repeats, with each Interactive Device 105 alternating outputs, until the Pattern 255 is completed or interrupted. In some embodiments, two or more Interactive Devices 105 can output audio at the same time, based on the Pattern 255. For example, in such an embodiment, the Pattern 255 may specify that two or more of the participating Interactive Devices 105 should simultaneously output audio. In some embodiments, this output can use the same Profile(s) 260 and/or the same Audio Files 265, such that the Interactive Devices 105 appear to be speaking in unison or reciting the same phrase together. In other embodiments, the output can differ between the Interactive Devices 105, such that it appears they are arguing or talking over each other in an excited manner.

In this way, because of the unique and pseudo-random combination of Patterns 255, Profiles 260, and portions of audio, the Interactive Device 105 can thus generate dynamic and immersive interactions that appear to be random and genuine, even if they utilize predefined Patterns 255 and Profiles 260, and rely on limited Audio Files 265. This reduces the costs required to create the Interactive Devices 105, as the need for voice acting and script writing is significantly reduced.

Further, the number of possible interactions is increased dramatically. Moreover, in embodiments, the computational resources required by each Interactive Device 105 are reduced, as compared to existing devices. For example, the required storage is reduced significantly, because fewer Audio Files 265 are required to implement the interactions. Additionally, in embodiments, the Interactive Device 105 operate as standalone devices (e.g., without the need for a computer or mobile phone). That is, in embodiments disclosed herein, the Interactive Device 105 does not require a remote device to perform any operations or transformations in order to ensure the interaction is immersive.

Figure 5:
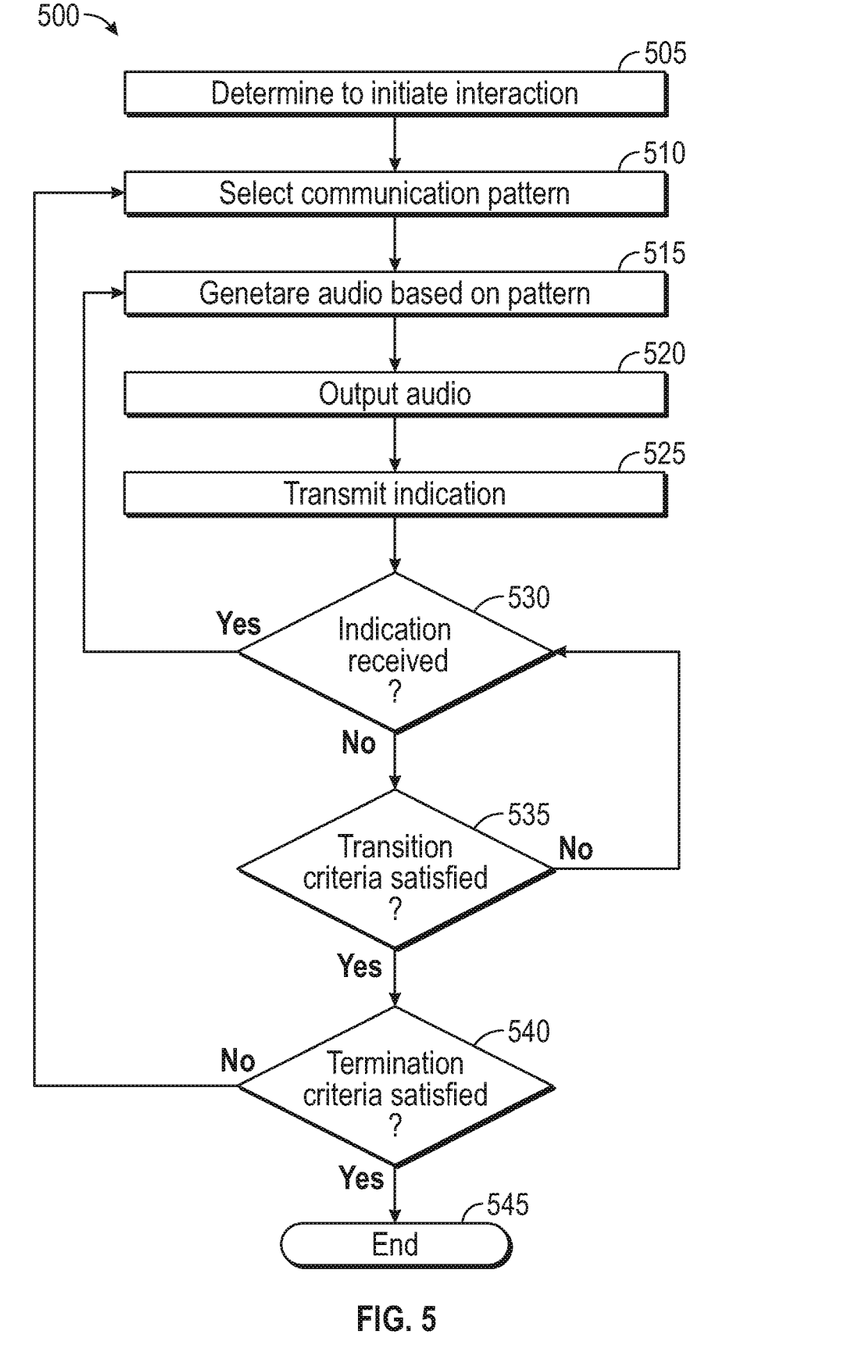
FIG. 5 is a flow diagram illustrating a method of creating an interactive communication based on communication patterns, according to one embodiment disclosed herein.

FIG. 5 is a flow diagram illustrating a method 500 of creating an interactive communication based on communication patterns, according to one embodiment disclosed herein. In the illustrated embodiment, the method 500 begins at block 505, where an Interactive Device 105 determines to initiate an interaction. As discussed above, in embodiments, this determination may be made based on determining that another Interactive Device 105 is within a predefined range, based on receiving input or interaction from a user, and the like. The method 500 then proceeds to block 510, where the Interactive Device 105 selects a predefined communication Pattern 255 to be used for the interaction. At block 515, the Interactive Device 105 generates audio based on the selected Pattern 255. That is, in an embodiment, the Interactive Device 105 identifies the Profile(s) 260 specified by the first segment of the Pattern 255, and selects one or more portions of one or more Audio Files 265. The Interactive Device 105 then modifies, transforms, or otherwise operates on the selected audio based on the Profile(s) 260.

The method 500 then proceeds to block 520, where the Interactive Device 105 outputs the generated audio. Once the output is complete (e.g., once the predefined time has passed), the method 500 proceeds to block 525, where the Interactive Device 105 transmits an indication that it has finished outputting the audio. In some embodiments, while the audio is being outputted, the Interactive Device 105 can receive interruptions (e.g., from another Interactive Device 105), or can determine spontaneously to terminate or transition to a new topic (e.g., based on a random or pseudo-random algorithm). For example, a random number generator may continuously or periodically provide a randomly-generated value. In such an embodiment, the Interactive Devices 105 may be programmed to switch to a different communication pattern when the generated value (or a set of generated values) satisfies a predefined condition (e.g. 'less than X', 'greater than Y', 'Z number of consecutive odd/even values', 'prime number', etc.). After transmitting the indication that the output has completed, the method 500 proceeds to block 530, where the Interactive Device 105 waits to receive a return transmission indicating that the other participating device has completed its output.

In the illustrated embodiment, if, at block 530, the Interactive Device 105 determines that the indication has not yet been received, the method 500 proceeds to block 535, where the Interactive Device 105 determines whether transition criteria are satisfied. For example, in one embodiment, a user picking up or otherwise interacting with the Interactive Device 105 can trigger a topic transition, even if the other device(s) are still outputting their audio. Similarly, in some embodiments, the Interactive Device 105 can randomly determine to transition to a new topic. Further, in some embodiments, one of the other Interactive Devices 105 may determine to transition to a new topic, and inform the participating devices. In embodiments, these random (or seemingly random) transitions can further increase immersion for users. If the transition criteria are not satisfied, the method 500 returns to block 530. If the criteria is met, however, the method 500 proceeds to block 540, discussed in more detail below.

Returning to block 530, when the Interactive Device 105 receives an indication that the other Interactive Device 105 has finished its output, the method 500 returns to block 515, where the Interactive Device 105 generates the next audio, based on the Pattern 255. In some embodiments, as discussed above, the Interactive Device 105 may wait until it receives a transmission indicating that it is the next device to output audio (e.g., if there are three or more Interactive Devices 105 participating in the interaction). In some embodiments, upon receiving the indication that one other device has completed the audio output, the Interactive Device 105 analyzes the Pattern 255 to determine whether it should respond next, or whether a different Interactive Device 105 is next to respond. If the Interactive Device 105 is not the next to output audio, the method 500 loops between blocks 530 and 535, as discussed above.

Returning to block 535, if the Interactive Device 105 determines that one or more transition criteria are satisfied, the method 500 continues to block 540, where the Interactive Device 105 determines whether the criteria also satisfy termination criteria. For example, in some embodiments, in addition to random or pseudo-random transitions to other topics (e.g., to new Patterns 255), the Interactive Device 105 can also determine to terminate the interaction entirely. In various embodiments, the termination criteria can also include receiving interaction from a user (e.g., being picked up, or detecting speech from the user), and the like. If the termination criteria are not satisfied, the method 500 returns to block 510, where the Interactive Device 105 selects a new Communication Pattern 255, in order to transition to the new interaction. If the termination criteria are satisfied, however, the method 500 terminates at block 545.

It should be understood that the method 500 can readily apply to one-to-one interactions between devices, as well as group interactions between more than two interactive devices, where each interactive device involved in the group interaction may have a different role or part in the conversation. For example, two or more interactive devices may say the same thing (e.g., output the same audio, modified by the same audio profile) at the same time, or close to the same time. Further, one or more other devices can laugh or respond to this unified output. Similarly, in an embodiment, after this simultaneous statement, all of the devices can begin interacting or singing together, followed by outputting a laughter sound. In other examples, interactive devices in a group interaction may act in unison yet in a unique manner consistent with their own character. For example, the communication pattern may involve singing, dancing, or laughing together as a group, where each device's audio and movement is expressed according to its own device-specific character filter.

Figure 6:
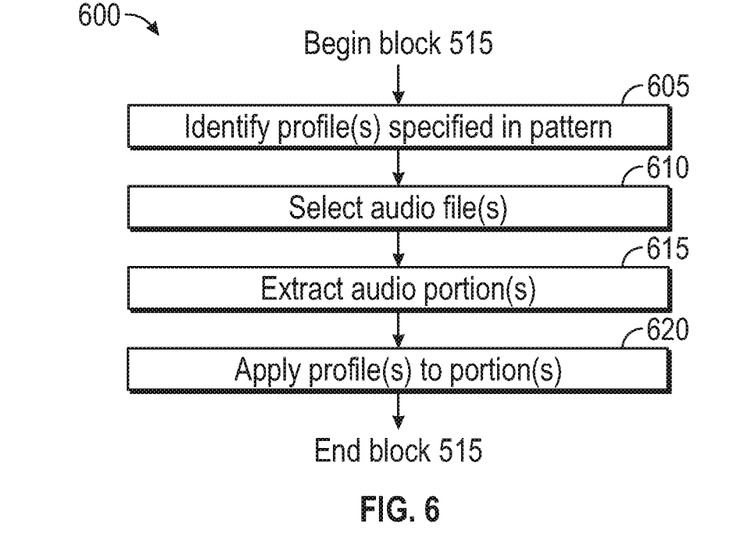
FIG. 6 is a flow diagram illustrating a method of modifying audio based on predefined profiles, according to one embodiment disclosed herein.

FIG. 6 is a flow diagram illustrating a method 600 of modifying audio based on predefined profiles, according to one embodiment disclosed herein. In the illustrated embodiment, the method 600 provides additional detail for block 515 of the method 500, where the Interactive Device 105 generates output audio based on the Pattern 255. The method 600 begins at block 605, where the Interactive Device 105 identifies one or more audio Profiles 260 that are specified in the current Pattern 255. In one embodiment, the Interactive Device 105 determines which segment, portion, or point in the interaction is next. For example, in one embodiment, if the Interactive Device 105 is the initiating device, it selects the first segment (e.g., the first output) specified in the Pattern 255. Further, in an embodiment, when an indication is received from another Interactive Device 105 indicating that the other device has finished its output, the indication can also identify which segment was just completed, and/or which segment is next. The Interactive Device 105 then identifies and extracts the Profile(s) 260 specified by this segment of the Pattern 255.

The method 600 then continues to block 610, where the Interactive Device 105 selects one or more Audio Files 265, to be used to satisfy the segment/Profiles 260. In some embodiments, the Interactive Device 105 uses one or more random or pseudo-random algorithms to determine how many of the Audio Files 265 to sample, as well as which Audio File(s) 265 to use. In one embodiment, the Pattern 255 or Profile 260 may specify one or more Audio Files 265. Similarly, in some embodiments, the Interactive Device 105 may receive instructions regarding which Audio File(s) 265 to use (e.g., from one or more other Interactive Devices 105).

The method 600 then proceeds to block 615, where the Interactive Device 105 extracts one or more audio portions from the selected Audio File(s) 265. In one embodiment, the Interactive Device 105 utilizes one or more random or pseudo-random algorithms to determine how many portions to extract, as well as which portion(s) to sample. Similarly, in some embodiments, the Interactive Device 105 uses one or more random or pseudo-random algorithms to determine an ordering of the portions when splicing them together. Additionally, in one embodiment, the Pattern 255, Profile 260, or the indication received from other Interactive Devices 105 may specify which portions of audio to utilize.

Finally, at block 620, the Interactive Device 105 applies the identified Profile(s) 260 to the extracted audio portion(s). In embodiments, this may include modifying, at various points in the audio, the pitch, cadence, inflection, volume, and other characteristics of the audio. For example, the Profile 260 may specify to increase the pitch at the end of the audio, such that the output resembles a question. In this way, the audio is modified to mimic or imitate a conversation, even if the Audio Files 265 include nothing but gibberish or random sounds.

Figure 7:
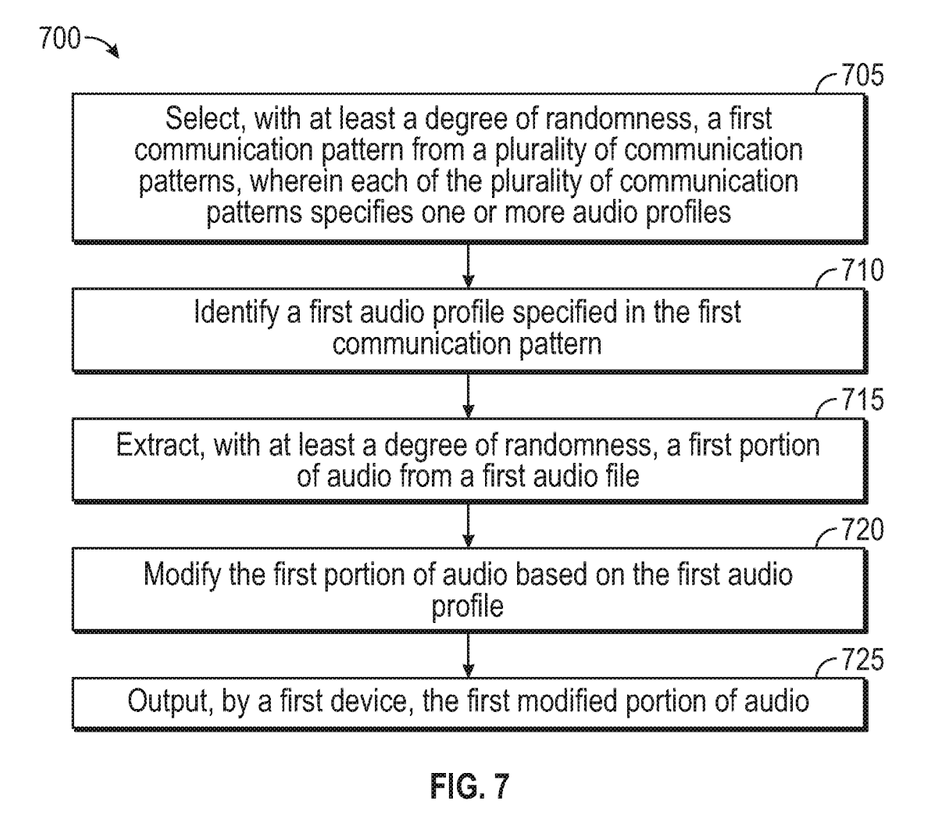
FIG. 7 is a flow diagram illustrating a method of generating interactive communications, according to one embodiment disclosed herein.

FIG. 7 is a flow diagram illustrating a method of generating interactive communications, according to one embodiment disclosed herein. The method 700 begins at block 705, where an Interaction Application 235 of a first Interactive Device 105 selects, with at least a degree of randomness, a first communication pattern from a plurality of communication patterns, wherein each of the plurality of communication patterns specifies one or more audio profiles. The method 700 then continues to block 710, where the Interaction Application 235 identifies a first audio profile specified in the first communication pattern. Further, at block 715, the Interaction Application 235 extracts, with at least a degree of randomness, a first portion of audio from a first audio file. The method 700 proceeds to block 720, where the Interaction Application 235 modifies the first portion of audio based on the first audio profile. Finally, at block 725, the Interaction Application 235 outputs the first modified portion of audio.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., Interaction Application 235) or related data available in the cloud. For example, the Interaction Application 235 could execute on a computing system in the cloud and generate or modify audio clips. In such a case, the Interaction Application 235 could utilize audio profiles and communication patterns to dynamically generate interactions at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   determining to output audio based on receiving, by a first device, a first input signal;
   responsive to determining to output audio, selecting, by the first device, a first communication pattern from a plurality of communication patterns, wherein each respective communication pattern of the plurality of communication patterns specifies a respective plurality of audio profiles, and wherein the first communication pattern, when selected, has no association with any particular audio file and is selected without reference to any particular audio file and with at least a degree of randomness;
   identifying, by the first device, a first audio profile specified in the first communication pattern, wherein the first audio profile specifies a first length of time and is not associated with any particular audio file;
   subsequent to selecting the first communication pattern, selecting, by the first device, a first audio file from a plurality of audio files, wherein the first audio file, when selected, has no association with the first communication pattern and is selected without reference to the first communication pattern and with at least a degree of randomness;
   extracting, by the first device, with at least a degree of randomness, from the first audio file, a first portion of audio corresponding to the specified first length of time;
   modifying, by the first device, the first portion of audio based on the first audio profile;
   outputting, by the first device, the first modified portion of audio;
   determining to output additional audio based on receiving, by the first device, a second input signal; and
   outputting, by the first device, a second modified portion of audio generated based at least in part on a second audio profile in the first communication pattern.

2. The method of claim 1, wherein outputting the first modified portion of audio is performed upon determining that a second device is within a predefined distance from the first device.

3. The method of claim 2, the method further comprising:
   transmitting, by the first device, to the second device, a signal identifying the first communication pattern;
   transmitting, by the first device, to the second device, a signal indicating that the first device has completed outputting the first modified portion of audio;
   receiving, at the first device, from the second device, a signal indicating that the second device has completed outputting a third modified portion of audio generated based at least in part on a third audio profile specified in the first communication pattern; and
   outputting, by the first device, a fourth modified portion of audio generated based at least in part on a fourth audio profile in the first communication pattern.

4. The method of claim 1, wherein the first audio profile defines a transformation to be applied to input audio.

5. The method of claim 4, wherein the transformation is at least one of: (i) modifying a pitch of at least a portion of the input audio, (ii) modifying an inflection of at least a portion of the input audio; (iii) modifying a volume of at least a portion of the input audio; or (iv) modifying a cadence of at least a portion of the input audio.

6. The method of claim 1, wherein extracting the first portion of audio from the first audio file comprises:
   selecting the first portion of audio in the first audio file based on a random or pseudo-random algorithm.

7. The method of claim 1, wherein extracting the first portion of audio from the first audio file comprises:
   extracting a first sub-portion of audio from the first audio file;
   extracting a second sub-portion of audio from the first audio file; and
   splicing the first and second sub-portions of audio to form the first portion of audio.

8. The method of claim 1, the method further comprising:
   determining, by the first device, to switch to a second communication pattern of the plurality of communication patterns, based on at least one of: (i) a timeout of the first communication pattern, (ii) a random or pseudo-random algorithm, or (iii) a user interaction;
   identifying, by the first device, a second audio profile specified in the second communication pattern;
   extracting, by the first device, a second portion of audio from a second audio file;
   modifying, by the first device, the second portion of audio from the second audio file based on the second audio profile; and
   outputting, by the first device, the second modified portion of audio from the second audio file.

9. A computer program product comprising a computer-readable storage medium having computer-readable program code embodied therewith, the computer-readable program code executable by one or more processors to perform an operation comprising:
   determining to output audio based on receiving, by a first device, a first input signal;
   responsive to determining to output audio, selecting, by the first device, a first communication pattern from a plurality of communication patterns, wherein each respective communication pattern of the plurality of communication patterns specifies a respective plurality of audio profiles, and wherein the first communication pattern, when selected, has no association with any particular audio file and is selected without reference to any particular audio file and with at least a degree of randomness;
   identifying, by the first device, a first audio profile specified in the first communication pattern, wherein the first audio profile specifies a first length of time and is not associated with any particular audio file;
   subsequent to selecting the first communication pattern, selecting, by the first device, a first audio file from a plurality of audio files, wherein the first audio file, when selected, has no association with the first communication pattern and is selected without reference to the first communication pattern and with at least a degree of randomness;

extracting, by the first device, with at least a degree of randomness, from the first audio file, a first portion of audio corresponding to the specified first length of time;

modifying, by the first device, the first portion of audio based on the first audio profile;

outputting, by the first device, the first modified portion of audio;

determining to output additional audio based on receiving, by the first device, a second input signal; and outputting, by the first device, a second modified portion of audio generated based at least in part on a second audio profile in the first communication pattern.

10. The computer program product of claim 9, wherein outputting the first modified portion of audio is performed upon determining that a second device is within a predefined distance from the first device.

11. The computer program product of claim 10, the operation further comprising:

transmitting, by the first device, to the second device, a signal identifying the first communication pattern;

transmitting, by the first device, to the second device, a signal indicating that the first device has completed outputting the first modified portion of audio;

receiving, at the first device, from the second device, a signal indicating that the second device has completed outputting a third modified portion of audio generated based at least in part on a third audio profile specified in the first communication pattern; and outputting, by the first device, a fourth modified portion of audio generated based at least in part on a fourth audio profile in the first communication pattern.

12. The computer program product of claim 9, wherein the first audio profile defines a transformation to be applied to input audio, wherein the transformation is at least one of: (i) modifying a pitch of at least a portion of the input audio, (ii) modifying an inflection of at least a portion of the input audio; (iii) modifying a volume of at least a portion of the input audio; or (iv) modifying a cadence of at least a portion of the input audio.

13. The computer program product of claim 9, wherein extracting the first portion of audio from the first audio file comprises:

extracting a first sub-portion of audio from the first audio file;

extracting a second sub-portion of audio from the first audio file; and splicing the first and second sub-portions of audio to form the first portion of audio.

14. The computer program product of claim 9, the operation further comprising:

determining, by the first device, with at least a degree of randomness, to switch to a second communication pattern of the plurality of communication patterns, based on at least one of: (i) a timeout of the first communication pattern, (ii) a random or pseudo-random algorithm, or (iii) a user interaction;

identifying, by the first device, a second audio profile specified in the second communication pattern;

extracting, by the first device, with at least a degree of randomness, a second portion of audio from a second audio file;

modifying, by the first device, the second portion of audio from the second audio file based on the second audio profile; and outputting, by the first device, the second modified portion of audio from the second audio file.

15. A system, comprising a first device, comprising:

one or more computer processors; and a memory containing a program which when executed by the one or more computer processors performs an operation, the operation comprising:

determining to output audio based on receiving, by a first device, a first input signal;

responsive to determining to output audio, selecting, by the first device, a first communication pattern from a plurality of communication patterns, wherein each respective communication pattern of the plurality of communication patterns specifies a respective plurality of audio profiles, and wherein the first communication pattern, when selected, has no association with any particular audio file and is selected without reference to any particular audio file and with at least a degree of randomness;

identifying, by the first device, a first audio profile specified in the first communication pattern, wherein the first audio profile specifies a first length of time and is not associated with any particular audio file;

subsequent to selecting the first communication pattern, selecting, by the first device, a first audio file from a plurality of audio files, wherein the first audio file, when selected, has no association with the first communication pattern and is selected without reference to the first communication pattern and with at least a degree of randomness;

extracting, by the first device, with at least a degree of randomness, from the first audio file, a first portion of audio corresponding to the specified first length of time;

modifying, by the first device, the first portion of audio based on the first audio profile;

outputting, by the first device, the first modified portion of audio;

determining to output additional audio based on receiving, by the first device, a second input signal; and outputting, by the first device, a second modified portion of audio generated based at least in part on a second audio profile in the first communication pattern.

16. The system of claim 15, wherein outputting the first modified portion of audio is performed upon determining that a second device is within a predefined distance from the first device.

17. The system of claim 16, the operation further comprising:

transmitting, by the first device, to the second device, a signal identifying the first communication pattern;

transmitting, by the first device, to the second device, a signal indicating that the first device has completed outputting the first modified portion of audio;

receiving, at the first device, from the second device, a signal indicating that the second device has completed outputting a third modified portion of audio generated based at least in part on a third audio profile specified in the first communication pattern; and outputting, by the first device, a fourth modified portion of audio generated based at least in part on a fourth audio profile in the first communication pattern.

18. The system of claim 15, wherein the first audio profile defines a transformation to be applied to input audio, wherein the transformation is at least one of: (i) modifying a pitch of at least a portion of the input audio, (ii) modifying an inflection of at least a portion of the input audio; (iii) modifying a volume of at least a portion of the input audio; or (iv) modifying a cadence of at least a portion of the input audio.

19. The system of claim 15, wherein extracting the first portion of audio from the first audio file comprises:
   extracting a first sub-portion of audio from the first audio file;
   extracting a second sub-portion of audio from the first audio file; and
   splicing the first and second sub-portions of audio to form the first portion of audio.

20. The system of claim 15, the operation further comprising:
   determining, by the first device, to switch to a second communication pattern of the plurality of communication patterns, based on at least one of: (i) a timeout of the first communication pattern, (ii) a random or pseudo-random algorithm, or (iii) a user interaction;
   identifying, by the first device, a second audio profile specified in the second communication pattern;
   extracting, by the first device, a second portion of audio from a second audio file;
   modifying, by the first device, the second portion of audio from the second audio file based on the second audio profile; and
   outputting, by the first device, the second modified portion of audio from the second audio file.

\* \* \* \* \*